United States Patent [19]

Rich et al.

[11] 4,310,272

[45] Jan. 12, 1982

[54] THREADED FASTENER AND STRUCTURAL JOINT ATTAINED THEREWITH

[75] Inventors: Roger K. Rich, Rural Retreat; Charles B. Testerman, Wytheville, both of Va.

[73] Assignee: Textron Inc., Providence, R.I.

[21] Appl. No.: 113,353

[22] Filed: Jan. 18, 1980

[51] Int. Cl.³ .............................................. F16B 39/28
[52] U.S. Cl. ..................................... 411/185; 403/408
[58] Field of Search ............... 151/37, 35, 34; 85/9 R, 85/41; 339/263 R, 242; 403/408; 411/185, 187, 188, 186, 184, 176, 163

[56] References Cited

U.S. PATENT DOCUMENTS

| | | | |
|---|---|---|---|
| 1,827,628 | 10/1931 | Twedell | 85/9 R |
| 1,864,211 | 6/1932 | Olson | 85/9 R |
| 1,875,930 | 9/1932 | Martin | 151/38 |
| 2,024,070 | 12/1935 | Sharp | 10/27 R |
| 2,076,041 | 4/1937 | Payne | 85/41 |
| 3,073,207 | 1/1963 | Lovisek | 85/48 |
| 3,241,422 | 3/1966 | Heimovics | 85/9 R |
| 3,247,752 | 4/1966 | Greenleaf et al. | 85/1 JP |
| 3,389,734 | 6/1968 | Gutshall | 151/37 |
| 3,469,490 | 9/1969 | Pearce, Jr. | 85/1 JP |
| 3,605,845 | 9/1971 | Junker | 151/37 |
| 3,803,972 | 4/1974 | Deutsher | 85/1 JP |
| 3,913,649 | 10/1975 | Stanaitis | 151/38 |
| 3,967,875 | 7/1976 | Stanaitis | 151/37 X |

FOREIGN PATENT DOCUMENTS

| | | | |
|---|---|---|---|
| 246819 | 8/1963 | Australia | 151/37 |
| 1470783 | 4/1977 | United Kingdom | 10/10 R |

*Primary Examiner*—Ramon S. Britts
*Attorney, Agent, or Firm*—Trexler, Bushnell & Wolters, Ltd.

[57] ABSTRACT

A structural joint including a relatively thin workpiece and an externally threaded fastener having a flanged head with workpiece clamping means on the underside thereof. The clamping means comprises an annular rim on the flanged portion of the head defining a cup-shaped portion having a depth no greater than approximately one-half the pitch of the fastener thread which acts to draw the workpiece material into engagement with the rim.

5 Claims, 12 Drawing Figures

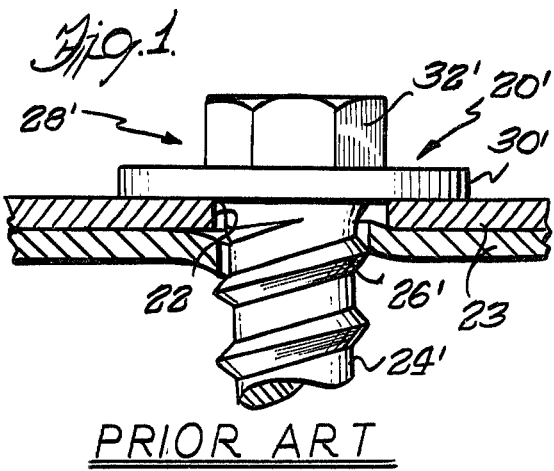
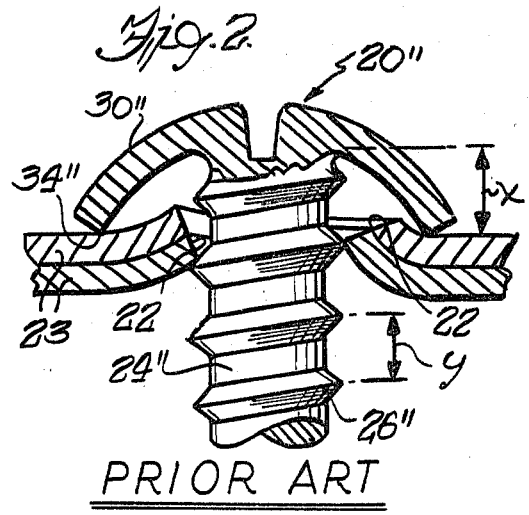
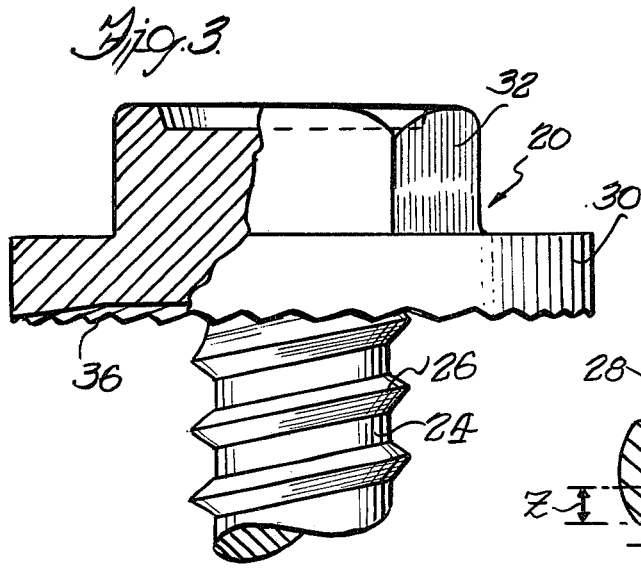
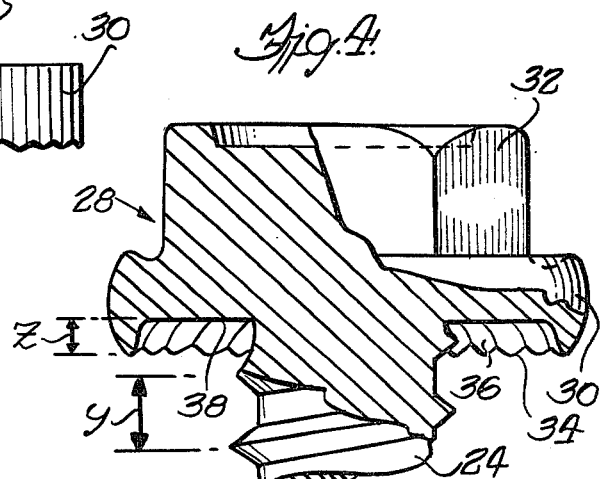
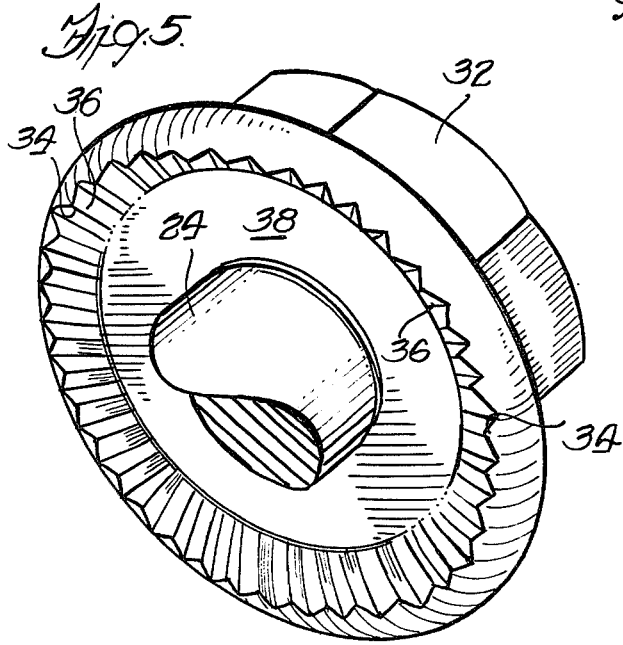

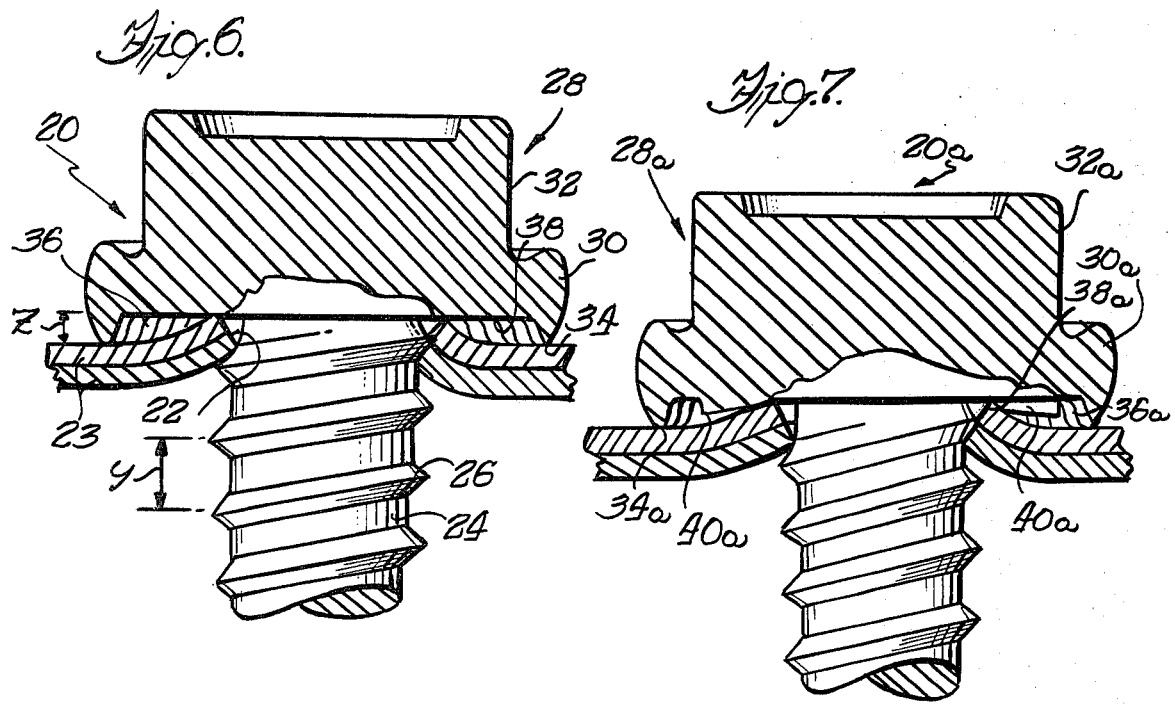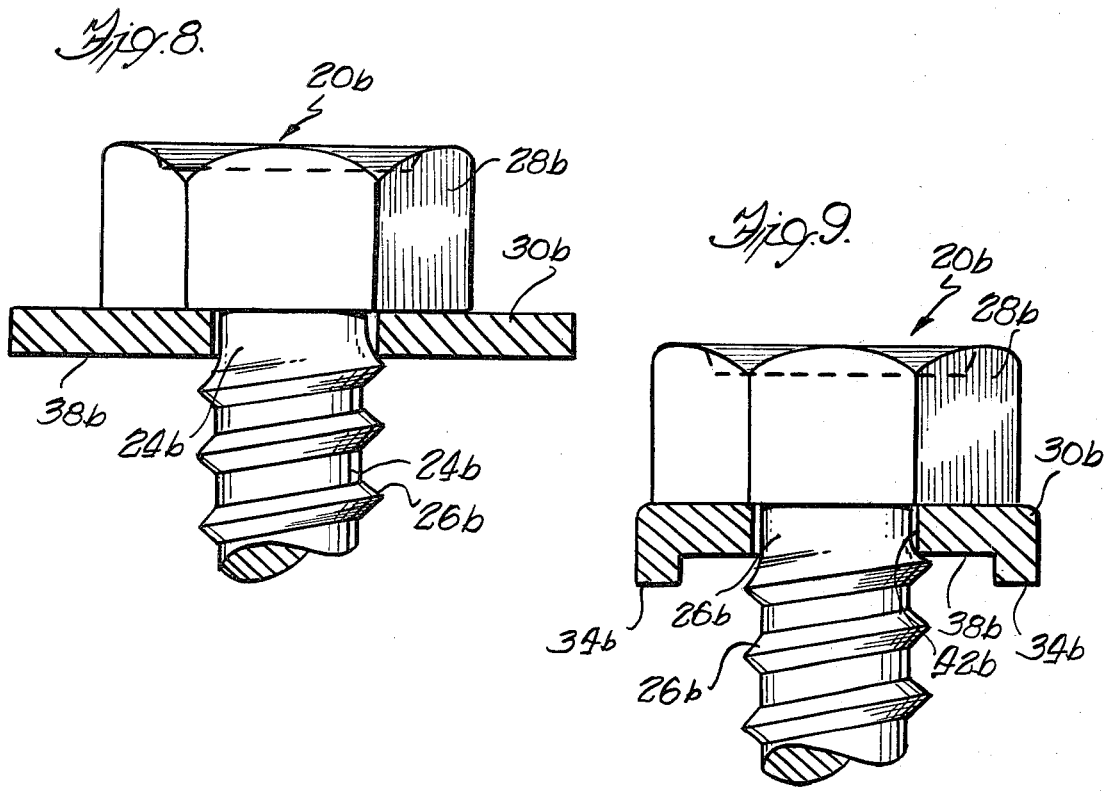

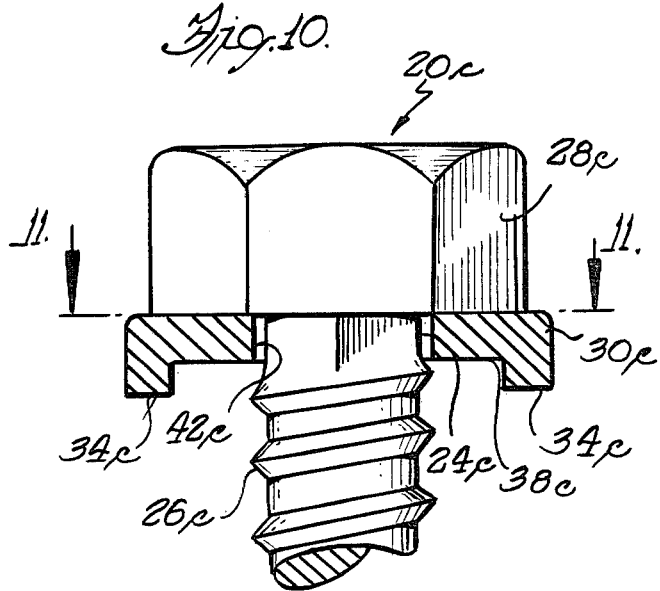
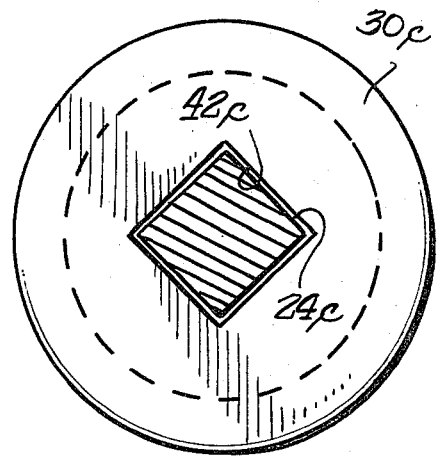
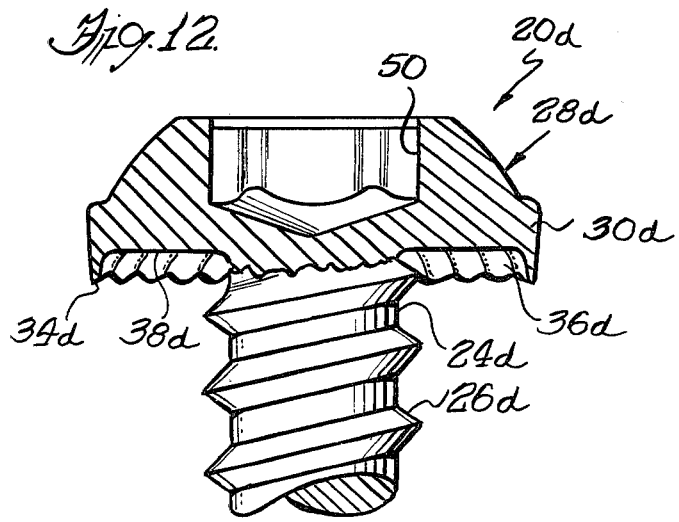

THREADED FASTENER AND STRUCTURAL JOINT ATTAINED THEREWITH

BACKGROUND OF THE INVENTION

The present invention relates to a screw threaded fastener and to a structural joint achieved with said fastener when used to engage one or more relatively thin workpieces to produce clamped engagement. More specifically, the fastener member ensures that the aperture defining material of the relatively thin workpieces is drawn into wedged engagement with the driving head of the fastener, thereby limiting the degree of deformation that said aperture may undergo during clamping, and preventing disengagement of the fastener thread from the workpiece material.

Before discussing in detail the specific features of the present invention, it is believed that a brief review of the prior art and the inherent deficiencies therein will be beneficial, examples of which are shown in FIGS. 1 and 2 of the drawings. In this regard, it is only after one recognizes what is demanded in the art and what has been tried in order to fulfill this demand that the present invention can be fully appreciated and viewed in its proper perspective.

More specifically, certain problems arise during the engagement or clamping of relatively thin workpieces with conventional fasteners and these problems are well known in the art. In this regard, in order to attain clamped engagement, the workpiece must be drawn by the screw thread against the enlarged head portion of the fastener. During manufacture of conventional fasteners, a blank is provided having a shank and an enlarged head portion, the screw thread being formed by cold rolling of the shank between a pair of thread forming dies. Due to the presence of the enlarged head portion, the area of engagement of the dies with respect to the fastener shank is limited, and as such the thread immediately adjacent said enlarged head is of an incomplete or partial formation.

With relatively thick material, the presence of a partially incomplete thread turn adjacent the driving head is of little or no consequence, as the gripping function is effected by the fully formed threads on the shank displaced axially somewhat from the enlarged head. Where relatively thin sheet material is employed, as is the case in many industries, and especially the automotive industry, seeking to effect cost reduction, the gripping capacity of the thread turn adjacent the fastener head becomes of consequence. In many instances, due to the partially incomplete nature of the thread form adjacent the fastener head, gripping engagement with the workpiece is not attained, and the fastener will merely spin without drawing the workpiece into clamped relation; an occurence termed in the art "spin-out". Even if some degree of gripping engagement is effected by the thread form adjacent the fastener head, slight over torquing of the fastener will cause the sheet material or the partially formed thread to deform, thereby producing "spin-out", and losing what clamping engagement had been initially attained.

A number of solutions to the problem of spin-out have been proposed, one such solution being shown in FIG. 2 of the drawings. With respect to this prior art embodiment, the fastener head or flange is formed to a cup-shaped configuration. As such, the cup-shaped configuration overlaps the incomplete thread turn and the rim provides a surface against which the workpiece abutts during clamping. Thus, this design attempts to ensure that the partially incomplete thread turn adjacent the driving head is not relied upon to draw the workpiece into clamped engagement. While in theory this design overcomes certain of the prior art problems, in practice it has given rise to others and has not been totally satisfactory. More specifically, the depth of the cup-shaped flange has not been controlled and often was of a value equal to or greater than that of the screw pitch. Thus, as the workpiece materials become thinner, they are more easily subjected to deformation, such that over torquing or continued torquing of the fastener will result in the sheet material being drawn upwardly into the space provided by the cup-shaped flange. This action produces several undesirable results. Most importantly, deformation of the aperture defining material of the workpiece tends to enlarge the aperture, which can occur to such an extent that the gripping engagement with the thread form is destroyed, and the fastener tends to "spin-out" or strip the sheet metal material, destroying the clamped relation. Further, this movement of the workpiece material inwardly results in the partially formed or underfilled thread adjacent to the head being relied upon to effect the holding or gripping action required. As such, slight over torquing will result in loss of the clamped engagement. As still an additional factor, use of cup-shaped head also reduces the degree of frictional engagement of the fastener head with the workpiece, and a greater tendency for over torquing results.

The present invention overcomes the above-discussed prior art problems to a large extent by utilizing a cup-shaped flange or fastener head, wherein the depth of the cup-shaped configuration is closely controlled and limited. Preferably, the depth of the cup-shaped configuration is limited to approximately one-half the pitch of the thread or less, a value which has proven satisfactory in various tests and experiments. As such, the cup-shaped configuration provides a slight overlap of the thread, which decreases to a great extent the dependency upon the underfilled or partially formed thread turn adjacent the driving head for attaining clamped engagement with the workpiece. As an additional matter, the rather shallow or limited depth of the cup-shaped configuration ensures that the edge of the workpiece aperture will be drawn into contact with the base surface, and will in fact be wedged into said engagement by the screw thread. When this wedging action occurs, not only is the clamping action enhanced, but any expansion of the aperture is precluded. As a further matter, the contact of the aperture edge with the driving head serves to increase the frictional contact of the fastener with the workpiece, and prevents over torquing of the joint.

Attention is now directed to the drawings, whcih illustrate not only several embodiments of the present invention but also embodiments of the prior art. In this regard, it should be kept in mind that the illustrated embodiments are but several preferred types which have been selected for purposes of disclosure, and it is envisioned and intended that various modifications or alterations will be developed, without departing from the scope of the invention.

DESCRIPTION OF THE DRAWINGS

FIG. 1 is a partial sectional view of a first type of prior art fastener and a joint effected therewith;

FIG. 2 is a partial sectional view of a structural joint effected with a second type of prior art fastener;

FIG. 3 is a fragmentary, elevational view partially in sections; of a fastener blank, after thread rolling;

FIG. 4 is an elevational view of the completed fastener, partially in section, about to be engaged with overlapped apertured workpieces;

FIG. 5 is a fragmentary perspective view of the cup-shaped flange and the driving head of the fastener of FIG. 4;

FIG. 6 is a fragmentary, partial sectional view of a joint attained with the fastener of FIG. 4;

FIG. 7 is a fragmentary, partial sectional view of a modified form of the invention;

FIGS. 8 and 9 illustrate still another modified form of the invention wherein the flange member is provided by a separate, captive washer element formed to a cup-shaped configuration;

FIGS. 10 and 11 illustrate a second version of the embodiment of the invention as illustrated in FIGS. 8 and 9, wherein the washer element is precluded from relative rotation;

FIG. 12 is a fragmentary, partial sectional view of still a further modified form of the invention.

DESCRIPTION OF THE ILLUSTRATED EMBODIMENT

Looking now to the drawings, FIGS. 1 and 2 illustrate two forms of prior art types of fasteners and the structural joints attained therewith, upon engagement with relatively thin workpieces. For purposes of further understanding of the present invention and of the inherent problems with these prior art types of fasteners and their structural joints, a brief discussion will be had with respect to each embodiment. In this regard, the reference characters employed to designate features or components of the fasteners will be designated by a prime (') suffix with respect to FIG. 1 and a double prime (") with respect to FIG. 2.

Looking first to FIG. 1, the fastener as shown therein is designated generally 20' and is engaged within an aperture 22 formed in a pair of superposed workpieces 23. The fastener 20' includes a threaded shank 24' and an enlarged head portion 28', with the shank 24' having a thread 26' formed thereon, and the enlarged head portion 28' including a flange segment 30' and a driving head segment 32'. Upon assembly of the joint as illustrated in FIG. 1, the fastener 20' is engaged in the aperture 22 provided by the workpieces 23 with the thread 26' engaging and deforming the aperture wall slightly to achieve the necessary gripping engagement. As the fastener 20' is rotated, the workpieces 23 are drawn into clamped engagement between the flange segment 30' and the screw thread 26'. As can be seen in FIG. 1, the last thread turn of the thread form 26' adjacent the flange segment 30' is partially incomplete, or "underfilled" as said feature is termed in the art. Accordingly, where the workpieces 23' are relatively thin, the thread form 26' will initially have sufficient gripping contact with the workpiece as they are moved axially along the threads; however, at the critical point wherein said workpieces are forced into engagement with the flange segment 30', only the partially complete thread turn 26' adjacent the flange 30' is available to attain the clamping engagement. Thus, it can be appreciated from the above discussion that if the fastener arrangement as illustrated in FIG. 1 is over torqued only slightly, the engagement of the thread 26' with the aperture 22 will be destroyed and "spin-out" will result, destroying the clamped relation of the workpieces 23.

To overcome the problems inherent with the fastener 20', as illustrated in FIG. 1, a fastener design as illustrated in FIG. 2 was developed, which design is designated generally 20". The fastener 20" utilizes an enlarged head portion 28" having a flange segment 30" that is of a cup-like configuration, said flange 30" being formed to said cup-like configuration subsequent to formation of the thread 26". As such, the cup-like flange segment 30" extends axially along the shank 24" in overlapping relation to a portion of the thread 26", with the rim 34" as defined by the edge of the flange segment 30" providing an abutment for the apertured workpieces 23. This abutment provided by the rim 34" is disposed axially relative to the shank 24", such that the partially incomplete thread turn 26" adjacent the enlarged head 28" is not relied upon to effect gripping contact with the workpiece 23. In this regard, it was reasoned that the complete thread forms 26" approximate the plane of the rim 34" would effect the necessary gripping engagement thereby avoiding the problem inherent with the prior art embodiment of FIG. 1.

While the fastener 20" of FIG. 2 worked relatively well with certain thicknesses of workpiece materials, wherein the embodiment 20' of FIG. 1 would not, as the materials became thinner, certain inherent problems with the FIG. 2 embodiment 20" became apparent. More specifically, little or no concern was given to the depth of the cup-shaped flange 30", designated "X", and this depth "X" often exceeded the pitch "Y" of the thread 26". Accordingly, in use with relatively thin, easily deformable material, slight over torquing of the fastener (viz., continued rotation of the fastener after the rim 34" had engaged the workpiece 23) resulted in spin-out. Upon investigation it was found that during instances of over torquing, the fully formed thread turn 26" adjacent the plane of the rim 34" would tend to deform the workpiece material defining the aperture 22 causing said material to be drawn axially inward of the cup-shaped flange 30" and toward the fastener head 28". Due to the excessive depth "X" of the cup-shaped flange 30", the only available resistance to this continued deformation was the relative stiffness of the workpiece material. Since the workpiece material was relatively thin and possessed little relative stiffness, the continued turning of the fastener 20" tended to prolong the deformation of the aperture 22 causing the diameter thereof to expand to such an extent, that effected engagement with the thread 26" could no longer be maintained and "spin-out" resulted. As an additional matter, as the aperture 22 is deformed the locus of the points of contact with the workpiece material moves upwardly along the helix of the thread 26" toward the partially incomplete or underfilled turn adjacent the enlarged head 28", thereby further reducing the effectiveness of the threaded engagement and giving rise to "spin-out".

A primary embodiment of the fastener of the present invention which overcomes the problems inherent with the prior art embodiments 20' and 20" of FIGS. 1 and 2, is illustrated in FIGS. 3-6 and will be discussed in detail hereinafter. Directing attention to FIG. 3, there is shown an intermediate form of the fastener 20 of the present invention. That is, a form of the fastener which exists immediately prior to the last step in the fabricating process, i.e. formation of the cup-shaped configuration as explained more fully hereinafter. In this regard, it should be noted that the fastener 20 is initially formed from a blank having an enlarged head portion 28 defining a flange segment 30 and a hex shape, or otherwise configured, driving head segment 32. In addition to the enlarged head 28, fastener 20 also includes a shank 24 upon which a thread 26 has been formed by conventional cold rolling techniques. In this regard, the thread 26 is rolled on the shank 24 as close to the flange 30 as is possible with the thread rolling dies; however, it is to be understood that the thread turn immediately adjacent the enlarged head 28 is of a partially incomplete nature. Further, in the illustrated embodiment of FIGS. 3–5, the under surface of the flange 30 is provided with a plurality of teeth 36 at the time the enlarged head 28 is formed.

Next, the intermediate form of the fastener 20 as shown in FIG. 3 is subjected to a rolling or deforming operation, wherein the flange 30 is formed to the cup-shaped configuration as illustrated in FIG. 4. This cold working of the flange 30 produces a generally cup-shaped configuration with said flange 30 opening toward the threaded shank 24, and being relatively shallow in its depth "Z". In practice, the depth "Z" of the cup-shaped flange 30 is preferably no greater than one-half the pitch "Y" of the thread 26, which has proven to provide satisfactory results, however, this relationship is not an absolute, as it is sufficient that the depth "Z" be controlled such that the mode of operation as discussed hereinafter is attained. Further, the cup-shaped flange 30 also provides an axially facing rim 34 of a relatively jagged configuration, due to the inward and downward turning teeth 36 as the flange 30 is deformed from the configuration of FIG. 3 to that of FIG. 4. As an additional matter, the formation of the flange 30 to a generally cup-shaped configuration provides a base surface 38, which surface is defined by the underside of the enlarged head 28.

It should be noted further, that the outer surface of the cup-shaped flange 30 has been rounded and turned radially inward to a slight degree, as a result of the deforming operation. While the illustrated configuration is preferred, it results primarily from the method of fabrication and it is envisioned that altered methods of fabrication may be used which will produce a relatively cylindrical outer surface for the cup-shaped flange 30.

Directing attention now to FIG. 6, there is shown a structural joint attained upon the engagement of the fastener 20 of the present invention with a pair of apertured workpieces 23, such as initially shown in FIG. 4. In this regard, as the fastener 20 is engaged with the aperture 22 and is driven axially with respect to said aperture, the workpieces 23 are drawn toward the enlarged head portion 28. The thread form 26 will cause the workpieces 23 to engage against the rim 34 of the cup-shaped flange 30, which rim it will be recalled is relatively jagged due to the presence of the teeth 36, and as such will bite into the uppermost workpiece 23. Continued torquing or rotation of the fastener 20 will cause the material immediately surrounding the aperture 22 to be drawn inwardly of the cup-shaped flange 30 by the thread form 26. As the apertured defined material is drawn inwardly of said flange 30, the aperture material is in a sense flared upwardly such that the edges thereof are forced into engagement with the base surface 38, which engagement precludes or limits any further flaring or expansion of the aperture 22. In this condition, the rim 34 functions as an abutment and fulcrum, permitting only the edge material about the aperture 22 to be moved inwardly of the cup-shaped flange 30, and thus it is only the edge material that is flared upwardly into engagement with the base surface 38. As such, the edge material of the respective workpieces are in effect clamped or wedged between the thread form 26 and the base surface 38. As a further matter, it should be noted that due to the relatively shallow depth of the "Z" of the cup-shaped flange 30, the deformation or flaring of the aperture 22 is only slight. That is to say, due to the presence of the base surface 38, and the engagement therewith of the aperture 22 edge material, enlargement of the aperture 22 is limited and cannot proceed to an extent as would permit the thread form 26 to become disengaged. Further, with this design the threaded engagement is primarily effected by the portion of the last thread turn 26 which is relatively complete in its formation, and little, if any reliance is placed upon the incomplete portion of said thread turn to effect the clamping action.

As an additional factor, it should be noted that as the fastener 20 rotates, the teeth 36 on the rim 34 will bite into the surface of the uppermost workpiece 23. The biting action is important for several reasons, initially it serves as a means for increasing the resistance to turning of the fastener 20, and helps prevent over torquing. Further, depending upon the configuration of the teeth 36, these teeth can be used also to provide a locking action to prevent the fastener 20 from vibrating loose during service. As still an additional matter, in situations where it is desired to effect an electrical ground and the upper workpiece is coated with paint such as encountered with numerous connections in the assembly of automotive bodies, the teeth 36 will cut through the paint and will make firm electrical contact with the underlying metal thereby facilitating attainment of said electrical ground.

Thus, comparing the present invention to the prior art fastener 20' of FIG. 1, it should be noted that with the fastener 20' and the relatively flat flange 30' no wedging action is attained, and in fact the workpieces are actually flared somewhat in the opposite direction as illustrated in FIG. 1. Further, with the fastener 20 clamping of the workpieces 23 is not dependent upon the relatively incomplete thread form immediately adjacent the enlarged head portion 28. To the contrary, due to the presence of the cup-shaped flange 30, a more complete portion of thread 26 is used in effecting threaded engagement upon attainment of clamped engagement. As to the fastener 20" of FIG. 2, the fastener 20 of the present invention by limiting the depth "Z" of the cup-shaped flange, assures that the sheet material of the workpieces 23 are forced into engagement with the base surface 38. This action serves two important functions; initially, it produces a wedging or clamping action not attainable with the fastener 20", and secondly, the engagement with surface 38 prevents the aperture 22 from being expanded to such an extent as could adversely affect thread engagement.

Looking now to FIG. 7, a first modified version of the fastener 20 is disclosed, which version is designated as generally 20a. In this regard, the construction of fastener 20a is essentially identical to the fastener 20, as discussed, the only difference being the inclusion of an additional set of teeth 40a on the base surface 38a. As the fastener 20a is driven into seated or clamped engagement with the workpieces 23, and the edge of the aperture 22 is flared upwardly, said edge will engage the teeth 40a which said teeth further enhance the wedging action.

In practice, the teeth 40a may be used instead of the teeth 36a, or in addition thereto, as shown in FIG. 7. As a further matter, the teeth 40a can be biased either in the clockwise or counterclockwise direction, to provide an additional locking action preventing rotation of the fastener in the unlocking direction; or said teeth 40a can be biased to increase the driving torque required upon seating of the fastener, and thereby enhance the resistance of the fastener to over torquing.

With respect to FIGS. 8–11, there are illustrated two additional modified forms of the invention, viz., fastener assemblies 20b, FIGS. 8 and 9, 20c and FIGS. 10 and 11, wherein the cup-shaped flange is provided by a captive washer rather than the integral type flange arrangement of the fasteners 20 and 20a. More specifically, with regard to the fastener assembly 20b, FIG. 8 illustrates an intermediate form of the assembly prior to formation of the washers 30b into a cup-shaped configuration. It should be noted that the washer 30b is held captive on the fastener shank 24b by means of the thread 26b, which arrangement is attained by employment of a fabricating process well known in the art with respect to the production of "sems-type" assemblies. In this regard, the washer 30b is assembled over an unthreaded blank, and the thread 26b is then formed by an upsetting operation with the crest of the thread 26b serving to maintain the washer 30b in captive assembly on the shank 24b.

In practice, the structural joint attained with the fastener 20b of FIGS. 8 and 9, is essentially the same as that achieved with the fasteners 20 and 20a as discussed previously. In the illustrated embodiment, the washer 30b is shown without teeth, however, it is envisioned that a series of teeth may be provided on the edge or rim 34 of the washer for effecting biting engagement with the surface of the workpiece material, or a series of teeth such as the teeth 40a may be formed on the base surface 38b, or both forms of teeth may be used, if desired. As an additional matter, it should be noted that since the shank 24b of the fastener is circular, as is the aperture 42 provided in the washer 30b, upon the commencement of the clamping engagement with the workpiece, the washer 30b will remain relatively stationary, with the shank 24b and driving head 28b rotating relative thereto. This arrangement can be utilized in situations where marring of the surface of the uppermost workpiece 30b is not desired.

The fastener assembly 20c as shown in FIGS. 10 and 11 differs from the fastener assembly 20b, only in that the shank 24c adjacent the enlarged head portion 28c is of a polygonal configuration, as is the aperture 42c formed in the washer 30c. This arrangement is illustrated in FIG. 11. As such, upon use of the fastener assembly 20c, the captive washer 30c will rotate with the fastener, and the function thereof to attain a structural joint will be similar to that of fasteners 20 and 20a discussed previously. Here again, with this embodiment the rim 34c or base surface 38c of the washer may be provided with a series of teeth, as desired.

In FIG. 12, a further modified form of the invention is illustrated, which form is designated 20d. In this embodiment, the cup-shaped flange 30d is integral with the enlarged head portion 28d, and the primary difference with respect to the fastener 20 is that an internal socket 50 is provided in order to facilitate driving of the fastener with respect to the workpiece. As illustrated, this internal socket is of a multi-lobular configuration, and it is designed to receive a correspondingly shaped drive tool.

For purposes of illustration and discussion, several preferred embodiments of the invention have been illustrated and described. It is envisioned that those skilled in the art may well devise additional modifications, changes, or alterations with respect to the disclosed structures, without departing from the true spirit and scope of the invention. As such, the present invention is not limited to the dislcosed embodiments, but rather is defined by the claims appended hereto.

The invention is claimed as follows:

1. A structural joint comprising, in combination, an externally threaded fastener member including a shank segment having a continuous external thread formed on a portion thereof to a predetermined pitch, and an enlarged head segment including a drive tool engaging portion kand a flange portion, and an apertured relatively thin workpiece structure having a thickness that is not substantially greater than said thread pitch engaged by said fastener member with said threaded shank disposed in said aperture and the thread formed thereon engaged with the underside of the periphery of said aperture to draw said workpiece into clamped engagement with said flange portion of the enlarged head segment, said flange portion being formed to a cup-shaped configuration and opening in a direction toward said threaded shank said cup-shaped flange portion defining a rim and a base surface, said base surface extending substantially radially, and said rim extending substantially axially and substantially parallel to said shank to provide a cylindrical configuration and said rim overlapping at least partially the continuous thread on said shank the depth of said cup-shaped configuration being shallow and limited to a pre-determined value not greater than approximately one-half the pitch of said thread on the shank segment, said thread engaged with the underside of the periphery of said aperture drawing the workpiece material into engagement with said rim, and said rim providing a rigid abutment which permits only the workpiece material about the edge of said aperture to be deformed and flared internally of said rim, the deformed workpiece edge material being flared upwardly by said continuous thread and forced into wedged engagement between said thread and said base surface, said wedged engagement limiting and preventing enlargement of said aperture to an extent which would permit said thread to become disengaged from the underside of the periphery of said aperture in said workpiece material.

2. A structural joint as defined in claim 1, wherein said rim includes a plurality of inwardly facing teeth which serve to bite into the workpiece to enhance electrical contact between said fastener member and the workpiece, and to increase the resistance to driving torque.

3. A structural joint according to either claims 1 or 8, wherein there is provided teeth on said base surface into which said workpiece aperture is drawn into engagement.

4. A structural joint according to claim 1, wherein said flange portion is provided by a separate washer-like member mounted to an unthreaded portion of said shank intermediate a driving head which defines said drive tool engaging portion of the enlarged head segment.

5. A structural joint according to claim 4, wherein said unthreaded portion of the shank is of a polygonal configuration, and said washer-like member includes a central aperture of similar shape, to prevent relative rotation of said washer-like member defining the flange portion with respect to said driving head.

* * * * *